(12) United States Patent
Leong et al.

(10) Patent No.: US 11,486,893 B2
(45) Date of Patent: Nov. 1, 2022

(54) OPTICAL SENSING SYSTEM AND OPTICAL NAVIGATION SYSTEM

(71) Applicant: PixArt Imaging Inc., Hsin-Chu (TW)

(72) Inventors: Keen-Hun Leong, Penang (MY); Yueh Mei Kim, Penang (MY)

(73) Assignee: PixArt Imaging Inc., Hsin-Chu (TW)

( * ) Notice: Subject to any disclaimer, the term of this patent is extended or adjusted under 35 U.S.C. 154(b) by 260 days.

(21) Appl. No.: 17/063,728

(22) Filed: Oct. 6, 2020

(65) Prior Publication Data

US 2022/0107337 A1 Apr. 7, 2022

(51) Int. Cl.
*G01P 13/00* (2006.01)
*G06V 10/44* (2022.01)
*G06V 10/88* (2022.01)
*G06V 10/147* (2022.01)

(52) U.S. Cl.
CPC ............ *G01P 13/00* (2013.01); *G06V 10/147* (2022.01); *G06V 10/44* (2022.01); *G06V 10/88* (2022.01)

(58) Field of Classification Search
CPC ...... G01P 13/00; G06V 10/147; G06V 10/44; G06V 10/88; G06V 10/225; G06T 7/20; G06T 7/80; G01B 11/02; G01C 21/20
See application file for complete search history.

(56) References Cited

U.S. PATENT DOCUMENTS

| | | | | |
|---|---|---|---|---|
| 6,952,628 B2* | 10/2005 | Prutu | ............ | G01G 19/005 198/572 |
| 9,044,661 B2* | 6/2015 | Leonard | ............ | A63B 69/3676 |
| 9,223,005 B2* | 12/2015 | Lin | ............ | G01S 5/0284 |
| 2003/0048102 A1* | 3/2003 | Bartingale | ............ | G05D 1/0263 324/261 |
| 2010/0126780 A1* | 5/2010 | Inoue | ............ | G01G 13/08 177/1 |
| 2014/0343846 A1* | 11/2014 | Goldman | ............ | G05D 1/0272 701/525 |
| 2018/0284243 A1* | 10/2018 | Wood | ............ | G05D 1/0234 |
| 2021/0004567 A1* | 1/2021 | Hwangbo | ............ | G06V 10/145 |
| 2021/0237768 A1* | 8/2021 | Tateishi | ............ | G06V 20/588 |

* cited by examiner

*Primary Examiner* — Tuyen K Vo
(74) *Attorney, Agent, or Firm* — Winston Hsu

(57) ABSTRACT an optical sensing system comprising: a processing circuit; a first calibration optical sensor, comprising a first sensor edge and a second sensor edge opposite to the first sensor edge; and a second calibration optical sensor, away from the first calibration optical sensor for a first distance, comprising a third sensor edge and a fourth sensor edge opposite to the third sensor edge. The processing circuit determines a target object has moved for a target distance if an object pattern of the target object moves from a first location in the first calibration sensor to a second location in the second calibration sensor, wherein a first sum of a second distance which is between the first location and the first sensor edge and a third distance between the second location and the third sensor edge equals to a reference distance.

17 Claims, 3 Drawing Sheets

OPTICAL SENSING SYSTEM AND OPTICAL NAVIGATION SYSTEM

BACKGROUND OF THE INVENTION

1. Field of the Invention

The present invention relates to an optical sensing system and an optical navigation system, and particularly relates to an optical sensing system and an optical navigation system which can accurately calculate a movement of an object.

2. Description of the Prior Art

Conventionally, calibration of computing relative movement between an object and an optical sensor can be done by moving the object for a specific distance and accumulate the movement. This is repeated for a specific number of iteration and the accumulated movement is then averaged. For different objects, this has to be done all over again. This method is time consuming and needs objects. Also, it requires a high precision and high repeatability machine to move a specific distance.

Another method of calibration is to print a specific pattern on the object, intended for calibration. A camera is then used to perform imaging processing to recognize the start and end of the pattern while moving the object, at the same time accumulate the count. This method is expensive as it waste object and print ink, and in addition time consuming.

SUMMARY OF THE INVENTION

Therefore, one objective of the present invention is to provide an optical sensing system which can reduce the time and cost required for movement calibration.

Another objective of the present invention is to provide an optical navigation system which can reduce the time and cost required for movement calibration.

One embodiment of the present invention discloses an optical sensing system comprising: a processing circuit; a first calibration optical sensor, comprising a first sensor edge and a second sensor edge opposite to the first sensor edge; and a second calibration optical sensor, away from the first calibration optical sensor for a first distance, comprising a third sensor edge and a fourth sensor edge opposite to the third sensor edge. The processing circuit determines a target object has moved for a target distance if an object pattern of the target object moves from a first location in the first calibration sensor to a second location in the second calibration sensor, wherein a first sum of a second distance which is between the first location and the first sensor edge and a third distance between the second location and the third sensor edge equals to a reference distance.

Another embodiment of the present invention discloses: an optical navigation system comprising: a processing circuit; a first calibration optical sensor, comprising a first sensor edge and a second sensor edge opposite to the first sensor edge; and a second calibration optical sensor, away from the first calibration optical sensor for a first distance, comprising a third sensor edge and a fourth sensor edge opposite to the third sensor edge; and a normal optical sensor.

The processing circuit determines a target object has moved for a target distance if an object pattern of the target object moves from a first location in the first calibration sensor to a second location in the second calibration sensor, wherein a first sum of a second distance which is between the first location and the first sensor edge and a third distance between the second location and the third sensor edge equals to a reference distance. A movement of the target object computed based on the images captured by the normal optical sensor at the same time is recorded. The processing circuit performs navigation of the optical navigation system based on the recorded movement.

In view of above-mentioned methods, the movement computation can be calibrated by simple steps and simple systems, thus can reduce the time and cost required for movement calibration.

These and other objectives of the present invention will no doubt become obvious to those of ordinary skill in the art after reading the following detailed description of the preferred embodiment that is illustrated in the various figures and drawings.

DETAILED DESCRIPTION

Several embodiments are provided in following descriptions to explain the concept of the present invention. Each component in following descriptions can be implemented by hardware (e.g. a device or a circuit) or hardware with software (e.g. a program installed to a processor). Besides, the method in following descriptions can be executed by programs stored in a non-transitory computer readable recording medium such as a hard disk, an optical disc or a memory. Besides, the term "first", "second", "third" in following descriptions are only for the purpose of distinguishing different one elements, and do not mean the sequence of the elements. For example, a first device and a second device only mean these devices can have the same structure but are different devices.

Figure 1:
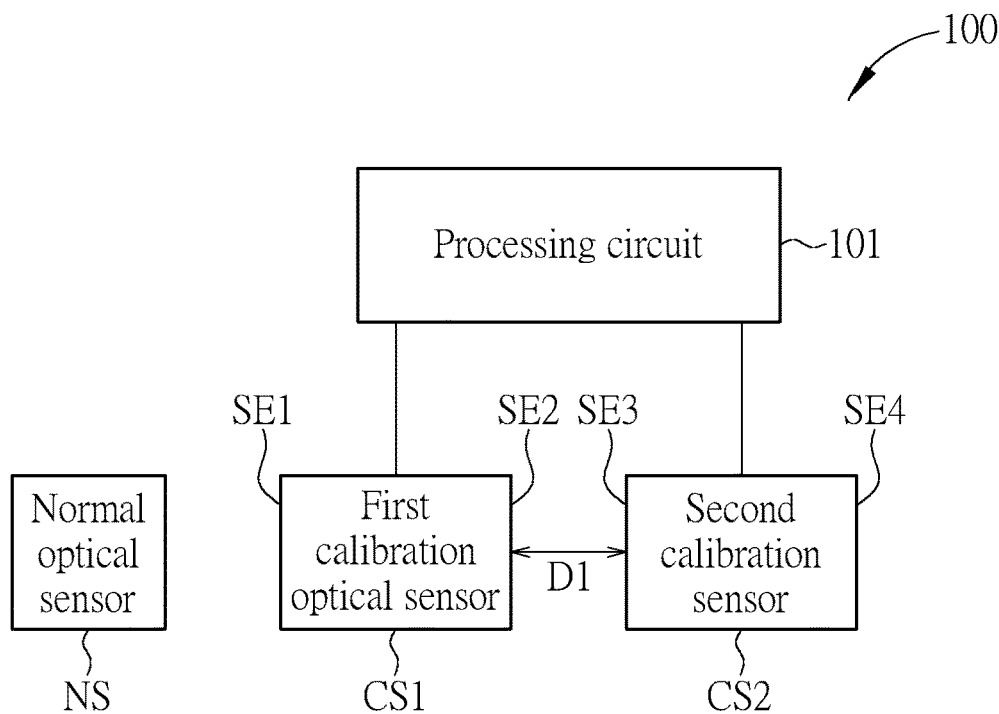
FIG. 1 is a block diagram illustrating an optical sensing system according to one embodiment of the present invention.

FIG. 1 is a block diagram illustrating an optical sensing system according to one embodiment of the present invention. As illustrated in FIG. 1, the optical sensing system 100 comprises a processing circuit 101 (e.g., a processor), a normal optical sensor NS, a first calibration optical sensor CS1, and a second calibration sensor CS2. The first calibration optical sensor CS1 comprises a first sensor edge SE1 and a second sensor edge SE2 opposite to the first sensor edge SE1. The second calibration optical sensor CS2, which is away from the first calibration optical sensor CS1 for a first distance D1, comprises a third sensor edge SE3 and a fourth sensor edge SE4 opposite to the third sensor edge SE3. In other words, another sensor edges exists between the first sensor edge SE1 and the second sensor edge SE2, and the first sensor edge SE1, the second sensor edge SE2 are perpendicular with this edge. Also, another sensor edges exists between the third sensor edge SE3 and the fourth sensor edge SE4, and the third sensor edge SE3, the fourth sensor edge SE4 are perpendicular with this edge. The first distance D1 can be a known value or an unknown value.

The processing circuit 101 determines a target object has moved for a target distance if an object pattern of the target object moves from a first location in the first calibration sensor CS1 to a second location in the second calibration sensor CS2. A first sum of a second distance which is between the first location and the first sensor edge SE1 and a third distance between the second location and the third sensor edge SE3 equals to a reference distance. Details of the reference distance will be described in following descriptions.

The normal optical sensor NS can capture images after the calibration of computing a movement of the target object. Also, the optical sensing system 100 can determine the movement of the object according to images captured by the normal optical sensor NS. It will be appreciated that the location of the normal optical sensor NS can be provided at any location, rather than limited to be on a line formed by the first calibration optical sensor CS1 and the second calibration optical sensor CS2.

Figure 2:
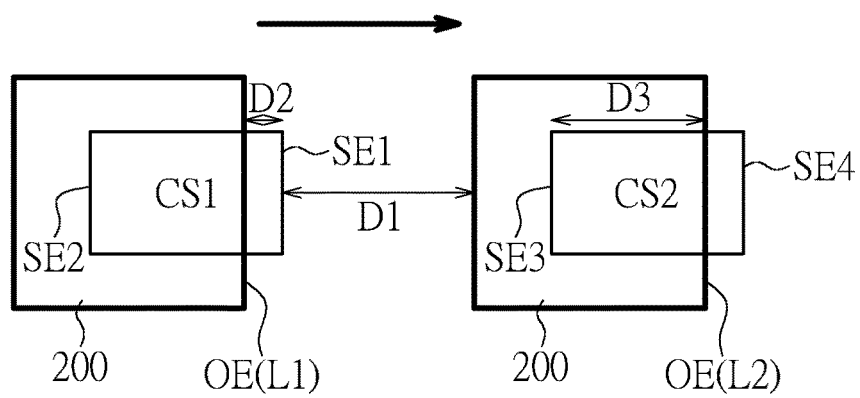
FIG. 2 is a schematic diagram illustrating how to determine a target object has moved for a target distance according to one embodiment of the present invention.

FIG. 2 is a schematic diagram illustrating how to determine a target object has moved for a target distance according to one embodiment of the present invention. Please note, for the convenience of explaining, only the first calibration optical sensor CS1 and the second calibration optical sensor CS2 are illustrated in drawings of following embodiments. In the embodiment of FIG. 2, the above-mentioned object pattern is the object edge OE of a target object 200 (e.g., a medium or a mark on a surface). As illustrated in FIG. 2, the object edge OE of the target object 200 is initially located at a first location L1 in the first calibration optical sensor CS1 and moves to a second location L2 in the second calibration optical sensor CS2.

The processing circuit 101 can determine the locations of the object edge OE, the first sensor edge SE1, the second sensor edge SE2, the third sensor edge SE3 and the fourth sensor edge SE4 according to images captured by the first calibration optical sensor SC_1 and the second calibration optical sensor SC_2. Therefore, a second distance D2 between the first location L1 and the first optical sensor edge SE1 and a third distance D3 between the second location L2 and the third optical sensor edge SE3 can be acquired by the processing circuit 101. The processing circuit 101 determines the target object 200 has moved for a target distance if a first sum of the second distance D2 and the third distance D3 equals to a reference distance.

Figure 3:
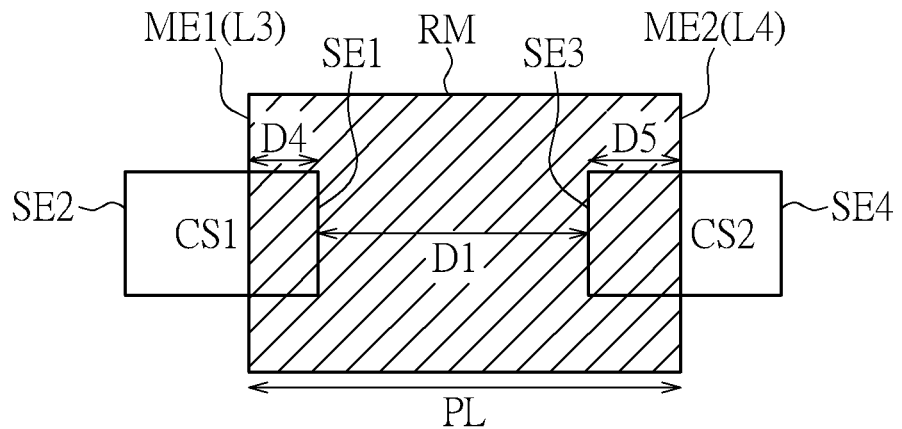
FIG. 3 is a schematic diagram illustrating how to acquire the reference distance depicted in the embodiment of FIG. 2, according to one embodiment of the present invention.

The reference distance can be acquired by many methods. FIG. 3 is a schematic diagram illustrating how to acquire the reference distance depicted in the embodiment of FIG. 2, according to one embodiment of the present invention. As illustrated in FIG. 3, a reference mark RM is provided, which has a first mark edge ME1 at a third location L3 in the first calibration optical sensor CS1 and a second mark edge ME2 at a fourth location L4 in the second calibration optical sensor CS2. The reference mark RM can be a printed pattern or a part of a specific solid surface (e.g., a surface of a desk which has some features which can be used as the reference mark).

Also, the reference mark RM has a predetermined length PL (e.g; one inch). In one embodiment, the first distance D1 is already known, and the reference distance can be acquired by subtracting the first distance D1 from the predetermined length PL to acquire the reference distance. Since the predetermined length PL and the first distance D1 are fixed, a second sum of the fourth distance D4 and the fifth distance D5 (i.e., the reference distance) is also fixed once the first mark edge ME1 is in a range of the first calibration optical sensor CS1 and the second mark edge ME2 is in a range of the second calibration optical sensor CS2, no matter how the reference mark RM moves. Therefore, the processing circuit 101 can determine the target object 200 has moved for the target distance (i.e., the predetermined length PL) if D2+D3 in FIG. 2 equals to D4+D5 in FIG. 3.

In another embodiment, the first distance D1 is unknown. In such case, a third location L3 of the first mark edge ME1 in the first calibration optical sensor CS1 and a fourth location L4 of the second mark edge ME2 in the second calibration optical sensor CS2 may be determined by the processing circuit 101. Then, a second sum of a fourth distance D4 which is between the third location L3 and the first sensor edge SE1, and a fifth distance D5 which is between the fourth location L4 and the third sensor edge SE3 is computed by the processing circuit 101. After that, the second sum is used as the reference distance. As above-mentioned, since the predetermined length PL and the first distance D1 are fixed, the second sum of the fourth distance D4 and the fifth distance D5 is also fixed once the first mark edge ME1 is in a range of the first calibration optical sensor CS1 and the second mark edge ME2 is in a range of the second calibration optical sensor CS2, no matter how the reference mark RM works. Therefore, the processing circuit 101 determines the target object 200 has moved for the target distance (i.e., the predetermined length PL) if D2+D3 in FIG. 2 equals to D4+D5 in FIG. 3.

Figure 4:
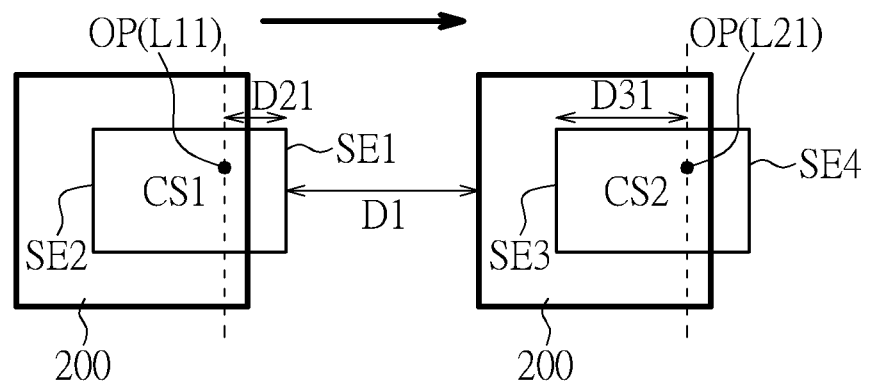
FIG. 4 is a schematic diagram illustrating how to determine a target object has moved for a target distance according to another embodiment of the present invention.

The above-mentioned object pattern of the target object 200 is not limited to the object edge OE illustrated in FIG. 2. FIG. 4 is a schematic diagram illustrating how to determine a target object has moved for a target distance according to another embodiment of the present invention. As illustrated in FIG. 4, the target object 200 comprises an object pattern OP which is not the object edge OE. The object patter OP can be any kind of pattern, such as a point, a circular, a rectangle or a square.

The object pattern OP is initially located at a first location L11 in the first calibration optical sensor CS1 and moves to a second location L21 in the second calibration optical sensor CS2. Please note the first location L11 in FIG. 4 and the first location L1 in FIG. 2 may be different. Additionally, the second location L21 in FIG. 4 and the second location L2 in FIG. 2 may be different. In such case, the second distance D21 between the first location L11 and the first optical sensor edge SE1 and a third distance D31 between the second location L21 and the third optical sensor edge SE3 can be acquired by the processing circuit 101. The processing circuit 101 determines the target object 200 has moved for a target distance if a first sum of the second distance D21 and the third distance D31 equals to the reference distance.

Figure 5:
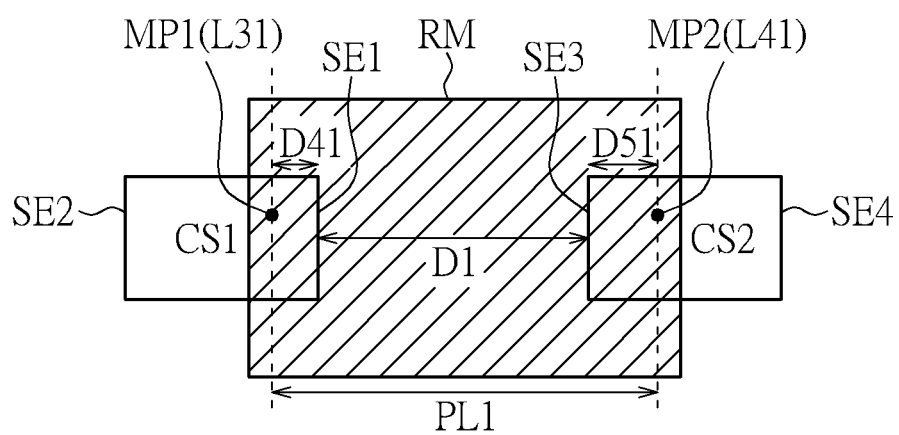
FIG. 5 is a schematic diagram illustrating how to acquire the reference distance depicted in the embodiment of FIG. 4, according to another embodiment of the present invention.

The reference distance in above-mentioned embodiments can be acquired based on other kinds of mark pattern rather than limited to the first mark edge ME1 and the second mark edge ME2 illustrated in the embodiment of FIG. 3. FIG. 5 is a schematic diagram illustrating how to acquire the reference distance depicted in the embodiment of FIG. 4, according to another embodiment of the present invention.

As illustrated in FIG. 5, a reference mark RM is provided, which has a first mark pattern MP1 at a third location L31 in the first calibration optical sensor CS1 and a second mark pattern MP2 at a fourth location L41 in the second calibration optical sensor CS2. The reference mark RM can be a printed pattern or a part of a specific solid surface (e.g., a surface of a desk which has some features served as the reference mark). The first mark pattern MP1 and the second mark pattern MP2 are not mark edges of the reference mark RM. Also, the first mark pattern MP1 and the second mark pattern MP2 can be any kind of patterns. For example, the first mark pattern MP1 and the second mark pattern MP2 can be points, circles, triangular or squares. Please note the third location L31 in FIG. 5 and the third location L3 in FIG. 3 may be different. Additionally, the fourth location L41 in FIG. 5 and the fourth location L3 in FIG. 4 may be different. Furthermore, in one embodiment, a line formed by the first mark pattern MP1 and the second mark pattern MP@ is perpendicular with the mark edges of the reference mark RM.

Also, a distance between the third location L31 and the fourth location L41 equals to a predetermined length PL1. In one embodiment, the first distance D1 is already known, and the reference distance can be acquired by subtracting the first distance D1 from the predetermined length PL1 to acquire the reference distance. Since the predetermined length PL1 and the first distance D1 are fixed, a third sum of the fourth distance D41 and the fifth distance D51 (i.e., the reference distance) is also fixed once the first mark pattern MP1 is in a range of the first calibration optical sensor CS1 and the second mark pattern MP2 is in a range of the second calibration optical sensor CS2, no matter how the reference mark RM moves. Therefore, the processing circuit 101 can determine the target object 200 has moved for the target distance (i.e., the predetermined length PL1) if D2+D3 in FIG. 2 equals to D41+D51 in FIG. 5.

In another embodiment, the first distance D1 is unknown. In such case, a third location L31 of the first mark pattern MP1 in the first calibration optical sensor CS1 and a fourth location L41 of the second mark pattern MP2 in the second calibration optical sensor CS2 are determined. Then, a second sum of a fourth distance D41 which is between the third location L31 and the first sensor edge SE1, and a fifth distance D51 which is between the fourth location L41 and the third sensor edge SE3 is computed by the processing circuit 101. After that, the second sum is used as the reference distance. As above-mentioned, since the predetermined length PL1 and the first distance D1 are fixed, the third sum of the fourth distance D41 and the fifth distance D51 is also fixed once the first mark pattern MP1 is in a range of the first calibration optical sensor CS1 and the second mark pattern MP2 is in a range of the second calibration optical sensor CS2. Therefore, the processing circuit 101 determines the target object 200 has moved for the target distance (i.e., the predetermined length PL1) if D2+D3 in FIG. 2 equals to D41+D51 in FIG. 5.

If the target object 200 is determined that it has moved for the target distance, the movement of the target object computed based on the images captured by the normal optical sensor NS at the same time is also recorded. Such recorded movement can be used for the afterward movement calculation of the optical sensing system 100. For example, if another object is determined to move for the recorded movement according to images captured by the normal sensor NS by the processing circuit 101, the processing circuit 101 may determine that the real movement of the object is the target distance. If the optical sensing system 100 is applied for optical navigation, it can be regarded as an optical navigation system. In such case, the processing circuit 101 can be regarded as performing navigation of the optical navigation system according to the recorded movement.

In view of above-mentioned methods, the movement computation can be calibrated by simple steps and simple systems, thus can reduce the time and cost required for movement calibration.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An optical sensing system, comprising:
a processing circuit;
a first calibration optical sensor, comprising a first sensor edge and a second sensor edge opposite to the first sensor edge; and
a second calibration optical sensor, away from the first calibration optical sensor fora first distance, comprising a third sensor edge and a fourth sensor edge opposite to the third sensor edge;
wherein the processing circuit determines a target object has moved for a target distance if an object pattern of the target object moves from a first location in the first calibration sensor to a second location in the second calibration sensor, wherein a first sum of a second distance which is between the first location and the first sensor edge and a third distance between the second location and the third sensor edge equals to a reference distance.

2. The optical sensing system of claim 1, wherein the object pattern is an object edge of the target object.

3. The optical sensing system of claim 1, further performing following steps to acquire the reference distance:
determining a third location of a first mark pattern of a reference mark in the first calibration sensor and determining a fourth location of a second mark pattern of the reference mark in the second calibration sensor, wherein a distance between the first mark pattern and the second mark pattern is a predetermined length;
computing a second sum of a fourth distance which is between the third location and the first sensor edge, and a fifth distance which is between the fourth location and the third sensor edge;
setting the second sum as the reference distance.

4. The optical sensing system of claim 3, wherein the first mark pattern is a first mark edge of the reference mark and the second mark pattern is a second mark edge of the reference mark, wherein the second mark edge is opposite to the first mark edge.

5. The optical sensing system of claim 3, wherein the reference mark is a printed pattern or a part of a specific solid surface.

6. The optical sensing system of claim 1, wherein the processing circuit further performs following steps to acquire the reference distance:
subtracting the first distance from a predetermined length to acquire the reference distance;
wherein the predetermined length is a distance between a first mark pattern and a second mark pattern of a reference mark.

7. The optical sensing system of claim 6, wherein the first mark pattern is a first mark edge of the reference mark and the second mark pattern is a second mark edge of the reference mark, wherein the second mark edge is opposite to the first mark edge.

8. The optical sensing system of claim 6, wherein the reference mark is a printed pattern or a part of a specific solid surface.

9. The optical sensing system of claim 1, further comprising:
a normal optical sensor, wherein the processing circuit determines a movement of an object according to optical captured by the normal optical sensor.

10. An optical navigation system, comprising:
a processing circuit;
a first calibration optical sensor, comprising a first sensor edge and a second sensor edge opposite to the first sensor edge;
a second calibration optical sensor, away from the first calibration optical sensor for a first distance, comprising a third sensor edge and a fourth sensor edge opposite to the third sensor edge; and
a normal optical sensor;
wherein the processing circuit determines a target object has moved for a target distance if an object pattern of the target object moves from a first location in the first calibration sensor to a second location in the second calibration sensor, wherein a first sum of a second distance which is between the first location and the first sensor edge and a third distance between the second location and the third sensor edge equals to a reference distance;
wherein a movement of the target object computed based on the optical data captured by the normal optical sensor is recorded when the processing circuit determines the target object has moved for the target distance;
wherein the processing circuit performs navigation of the optical navigation system based on the recorded movement.

11. The optical navigation system of claim 10, wherein the object pattern is an object edge of the target object.

12. The optical navigation system of claim 10, wherein the processing circuit further performs following steps to acquire the reference distance:
determining a third location of a first mark pattern of a reference mark in the first calibration sensor and determining a fourth location of a second mark pattern of the reference mark in the second calibration sensor, wherein a distance between the first mark pattern and the second mark pattern is a predetermined length;
computing a second sum of a fourth distance which is between the third location and the first sensor edge, and a fifth distance which is between the fourth location and the third sensor edge;
setting the second sum as the reference distance.

13. The optical navigation system of claim 12, wherein the first mark pattern is a first mark edge of the reference mark and the second mark pattern is a second mark edge of the reference mark, wherein the second mark edge is opposite to the first mark edge.

14. The optical navigation system of claim 12, wherein the reference mark is a printed pattern or a part of a specific solid surface.

15. The optical navigation system of claim 10, wherein the processing circuit further performs following steps to acquire the reference distance:
subtracting the first distance from a predetermined length to acquire the reference distance;
wherein the predetermined length is a distance between a first mark pattern and a second mark pattern of a reference mark.

16. The optical navigation system of claim 15, wherein the first mark pattern is a first mark edge of the reference mark and the second mark pattern is a second mark edge of the reference mark, wherein the second mark edge is opposite to the first mark edge.

17. The optical navigation system of claim 15, wherein the reference mark is a printed pattern or a part of a specific solid surface.

* * * * *